May 19, 1925.  1,538,491
W. B. REED
MOTOR VEHICLE SIGNAL DEVICE
Filed Dec. 27, 1922   2 Sheets-Sheet 1
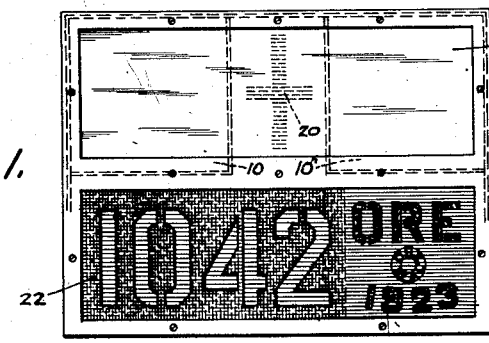
Fig. I.
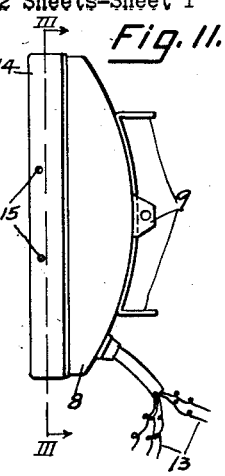
Fig. II.
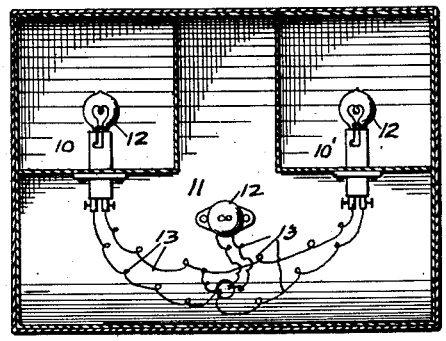
Fig. III.
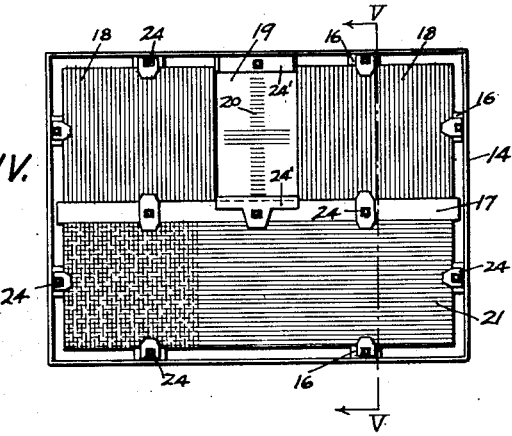
Fig. IV.
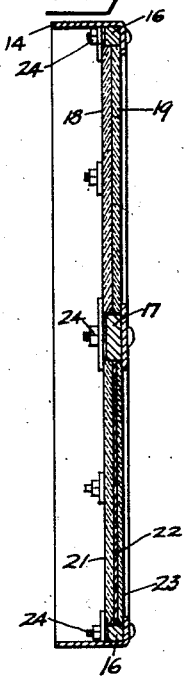
Fig. V.
INVENTOR
WILLIAM B. REED.
BY
ATTORNEY May 19, 1925. 1,538,491
W. B. REED
MOTOR VEHICLE SIGNAL DEVICE
Filed Dec. 27, 1922  2 Sheets-Sheet 2
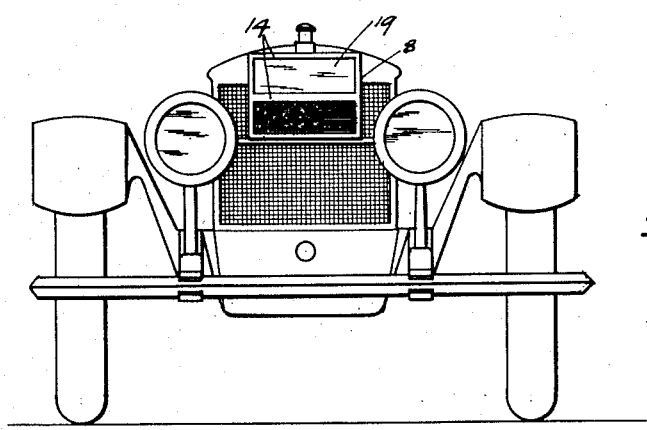
Fig. VI.
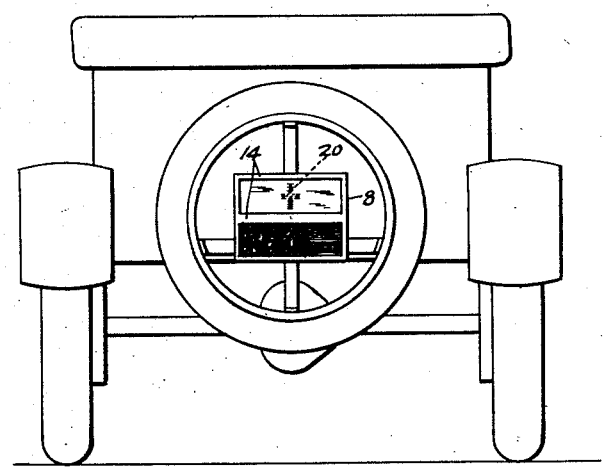
Fig. VII.
INVENTOR
WILLIAM B. REED.
BY
ATTORNEY Patented May 19, 1925.

1,538,491

UNITED STATES PATENT OFFICE.

WILLIAM B. REED, OF PORTLAND, OREGON.

MOTOR-VEHICLE SIGNAL DEVICE.

Application filed December 27, 1922. Serial No. 609,293.

*To all whom it may concern:*

Be it known that I, WILLIAM B. REED, a citizen of the United States, residing at Portland, in the county of Multnomah and State of Oregon, have invented a new and useful Improvement in Motor-Vehicle Signal Devices, of which the following is a specification, reference being had to the accompanying drawings.

My invention relates to signaling devices as a class.

The object of my invention is to provide a device of this class particularly arranged for motor vehicles, although it may be adapted for other uses. It is intended in my device to provide a casing wherein translucent glass is employed, parts of which have distinguishing colors, visible with and without illuminating lamps transmitting light from within the casing through the glass, and also allowing the transmitted light from the lamps to illuminate colored parts in the day or night time. Further to provide a display of official license inscriptions and colors upon the glass. I accomplish these objects, as well as others, by the construction, combination and arrangement of parts illustrated in the drawings which form a part hereof.

Fig. I is a front elevation of the casing with glass plates and stencil in position therein.

Fig. II is an end elevation of the casing.

Fig. III is a sectional elevation of the casing on the line III—III in Fig. II.

Fig. IV is a rear elevation of the casing cover showing the rear plates of glass in position.

Fig. V is an enlarged sectional view on the line V—V in Fig. IV.

Fig. VI is a front view of a motor vehicle with the device secured thereon in operative position.

Fig. VII is a like view at the rear of the vehicle.

Like characters refer to like parts in the views.

A casing 8 is provided, having means 9 upon the rear thereof whereby it may be secured in position upon a vehicle or other desired place. The casing 8 is divided into rectangular compartments 10—10' at each end of the upper portion of the casing. The walls of said compartments are opaque. The lower portion of the casing comprises a third compartment 11, which extends upwardly in its central part between the compartments 10—10'. All compartments are open outwardly. In each of the compartments, electric lamps 12, of common type, are centrally disposed. Electric wires 13 extend from filament terminals of these lamps to a suitable position upon the dashboard, steering wheel or other desired place convenient for the operator, where the same connect with terminals in the switches to the battery or source of electric energy. Near this position tell-tale lamps may be included in the wire circuits to inform the operator whether or not the electric energy is being transmitted to the signal lamps. A casing cover frame 14 is securable over the casing opening by fastening means 15. Within the rim of the frame and adjacent to the glass plates blocks 16 are arranged and a bar 17 extends transversely within the central part of the frame. In the right and left ends of the frame 14 are placed plates 18, of ruby glass of a size corresponding with that of the openings in the compartments 10—10' to the rear of same. In front of these plates is placed a plate 19, of opalescent glass, commonly known in the trade as opal cathedral glass, of milky white color. The plate 19 extends over and forwardly of said plates 18 and also over the opposing space between them which is in the upper part of the compartment 11 between compartments 10—10'. The central part of the plate 19 bears a suitable design, here shown as a blue cross 20, to indicate the forward end. It is preferable to arrange the compartments 10—10' and the portion of compartment 11 between them to comprise one-third each of the transverse upper portion of the casing area, but the dimensions may be varied as desired. In the lower part of the casing cover is placed a rectangular plate of glass 21 extending transversely over this portion. The left portion of this glass, see Fig. I, is shown as of yellow color, the right as of blue. All glass thus far described is translucent. Over and forwardly of the glass plate 21 a stencil plate 22 is placed. The stencil is of a yellow color on the surface of its outer face at the right and blue on the left, see Fig. I. The official license number is cut in the left portion of the stencil, and the letters of the State name and license year characters are cut in the right portion. Between the latter designations the State seal is stamped or printed on the stencil. Over the stencil a plate 23, of clear glass, is placed. All plates of glass and stencil are rigidly secured in said positions within the cover frame by fastening means 24 and 24'.

It is intended that the surface of the stencil shall have the official State color about the license numerals and the surface about the State and year characters to be of a color like that of the official characters for the year on a license plate, here illustrated as blue. That part of the glass 21 back of the license numerals shall be of a color lighter or darker than the official plate color, while that part of the glass 21 in the rear of the State name and year numerals shall be of the color these are on the official plate. The State seal is to be stamped or imprinted on the stencil plate for protection against counterfeiting the plate. A die should be used for this, which would make the expense of imitation too much to allow of ordinary counterfeiting operations. In the drawings I assume that the official license plate to be supplied has a yellow background with blue characters thereon. It will now be apparent that in the daylight the left part of the stencil with blue glass back will correspond to this color scheme. The right part of the stencil plate, however, reverses this, the stencil background being in blue and the glass to the rear of yellow, which is thus visible in the night time. At night, when the lamps are illuminated the stencil license characters only are displayed in blue light, while the State name and year numerals are displayed in yellow. By this arrangement the two official colors and their position can be determined either by day or by night, with or without illumination by the lamps.

It will now be seen that when the lamps are not illuminating, the upper part of the casing displays a neat white opalescent surface with a colored design in the center to indicate a rear end, and a stencil displaying the official license insignia of usual form. It is intended that the opalescent glass shall be distinctly prominent to indicate to an observer the precise place to look for signals. If a turn to right or left is to be made the respective signal lamp in compartment 10 or 10' is ignited. If slowing down or stopping, the operator ignites lamps in both compartments. The lamp in compartment 11 burns continuously during hours required for carrying head and tail lights. It is obvious that this will illuminate in white the signal indicating plate between these compartments and also the license plate during those hours. The lamps are controlled by switches near the operator. The signal cases are intended to be placed on both the forward and rear ends of a vehicle and are operated simultanously, there being no design as of the cross on the forward end.

In the rapid movements of motor vehicles, it is highly important for an operator to know the place of signal displays to enable him to observe the same quickly. A red signal displayed on opalescent glass, enclosed in a dark colored frame is highly and attractively visible. It is also important to comprehend the signals immediately and they should be plain and very simple, to enable an operator to grasp them upon more than one vehicle at approximately the same time. The display of red signals on each side of a central illuminated opalescent glass produces a system which is intelligent and accomplishes what has been stated. The inclusion of the illuminated license plate is also a valuable feature, making the whole apparatus of small size, compact and easily fitted to a car, also easily manipulated or cleaned. It also has the advantage of a complete outside glass protection, and the displays are apparent, regardless of mud or dust upon the glasses. The arrangement avoids confusion with any other lights placed near the apparatus. While I have illustrated a special stencil for the license plate as described, I may substitute the official license plate of common type, with the characters thereon punched in outline, to function as a stencil plate in the same position in a similar manner as the stencil plate illustrated, without departing from the principle of my invention. The purpose of this is to allow the use of the official plate should the issuing authority refuse to permit any other to be substituted.

I claim—

1. In a vehicle signal device, a rigidly secured translucent glass panel having two laterally aligned portions, the first portion of a color different from that of the characters on an official vehicle license plate of common type, the second portion of a color like that of the background of such a plate, and a stencil plate superimposed upon said glass panel, said stencil having cut therein, opposite the first panel portion, the numerals of an official vehicle license plate of common type, with a surface about them of like color to that of the background of such license plate, the said stencil also having cut therein, opposite the second portion of said panel, characters designating the licensing authority and year numerals, with a surface about the same of a color like that of the characters on such a license plate.

2. In a vehicle signal device, a rigidly secured translucent glass panel having two laterally aligned portions, the first portion of a color different from that of the characters on an official vehicle license plate of common type, the second portion of a color like that of the background of such a plate, a stencil plate superimposed upon said glass panel, said stencil having cut therein, opposite the first panel portion, the numerals of an official vehicle license plate of common type, with a surface about them of like color to that of the background of such license plate, the said stencil also having cut therein, opposite the second portion of said panel, characters designating the licensing authority and year numerals, with a surface about the same of a color like that of the characters on such a license plate, and a clear glass panel superimposed upon the stencil.

3. In a vehicle signal device, a rigidly secured translucent glass panel having two laterally aligned portions, the first portion of a color different from that of the characters on an official vehicle license plate of common type, the second portion of a color like that of the background of such a plate, a stencil plate superimposed upon said glass panel, said stencil having cut therein, opposite the first panel portion, the numerals of an official vehicle license plate of common type, with a surface about them of like color to that of the background of such license plate, the said stencil also having cut therein, opposite the second portion of said panel, characters designating the licensing authority and year numerals, with a surface about the same of a color like that of the characters on such a license plate, and means arranged rearwardly of said glass panel for illumination of and through the same and through the stencil openings.

4. In a vehicle signal device, a rigidly secured translucent glass panel having two laterally aligned portions, the first portion of a color different from that of the characters on an official vehicle license plate of common type, the second portion of a color like that of the background of such a plate, a stencil plate superimposed upon said glass panel, said stencil having cut therein, opposite the first panel portion, the numerals of an official vehicle license plate of common type, with a surface about them of like color to that of the background of such license plate, the said stencil also having cut therein, opposite the second portion of said panel, characters designating the licensing authority and year numerals, with a surface about the same of a color like that of the characters on such a license plate, a glass panel above said license panel, the former panel being positioned for illumination through the same for the purpose of a tail light signal, and a single lamp means arranged rearwardly of the said panels for illumination of and through both and the said stencil openings simultaneously.

WILLIAM B. REED.

Witnesses:
EDWARD E. O'NEILL,
HERBERT P. MURCHER.